June 22, 1965   A. R. FJERMESTAD   3,190,503
LIQUID ADDITIVE DISPENSER FOR CLEANSING SYSTEMS
Filed Oct. 16, 1963   2 Sheets-Sheet 1
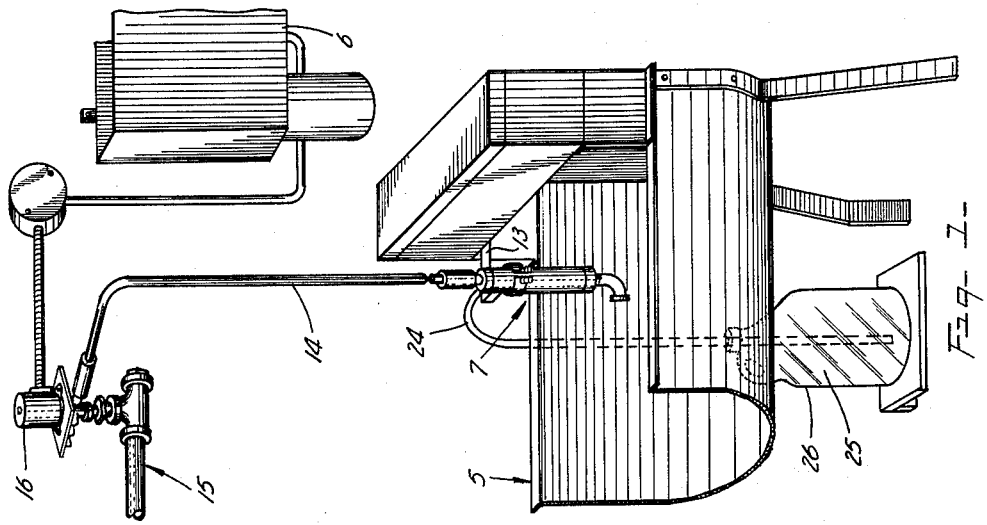
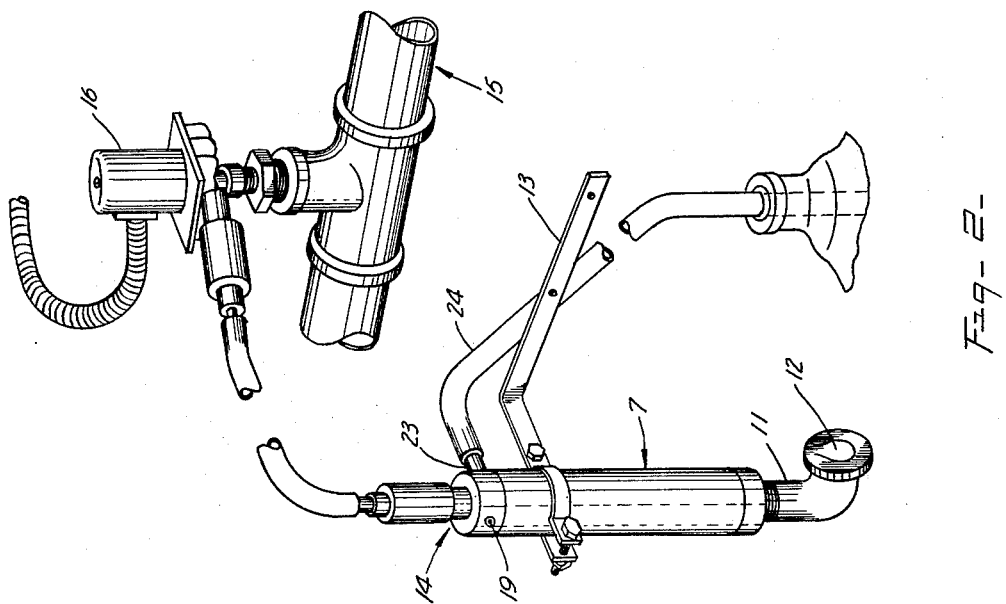
INVENTOR.
ARNOLD R. FJERMESTAD
BY
Schroeder & Siegfried
ATTORNEYS

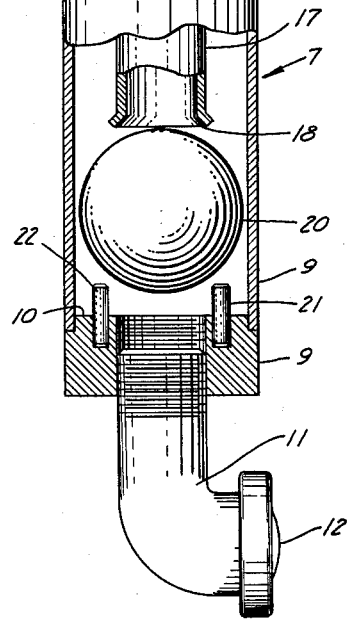
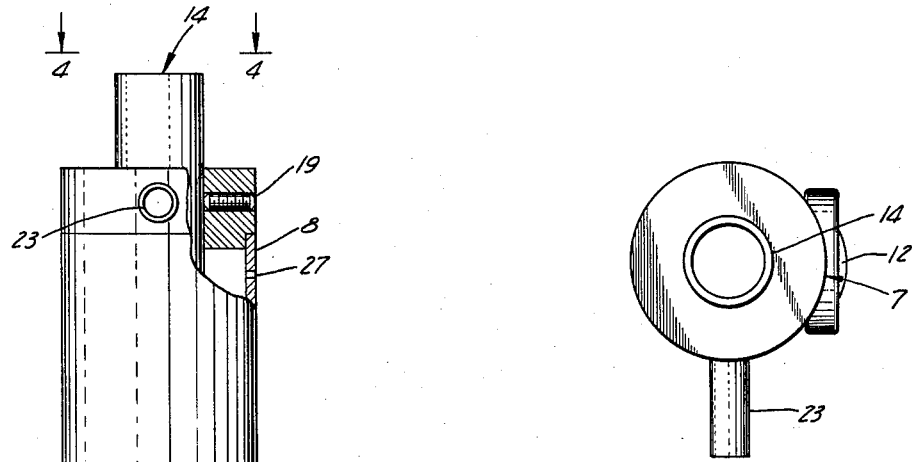

United States Patent Office 3,190,503
Patented June 22, 1965

3,190,503
LIQUID ADDITIVE DISPENSER FOR
CLEANSING SYSTEMS
Arnold R. Fjermestad, Albert Lea, Minn., assignor to National Cooperatives, Inc., Albert Lea, Minn., a corporation of the District of Columbia
Filed Oct. 16, 1963, Ser. No. 316,608
14 Claims. (Cl. 222—205)

This invention relates to automatic liquid acid or detergent metering devices for use in the dairy industry. More particularly, it relates to automatic dispensing systems for metering out predetermined quantities of acid or detergent into the rinse water of a milk handling system.

In the dairy industry it is customary and necessary to flush out the line in a milking machine system or milk conveying system with an alkaline solution to dissolve the fats and containing chemicals to put the minerals which have collected in the milk line during the milking and/or conveying operation into solution. This washing operation normally takes about twenty minutes. Thereafter steps must be taken to remove the alkaline solution entirely and to do this, it is necessary to rinse out the line with clear water. Since the health authorities require such rinsing, it is a common problem that deposits of minerals are left in such lines as a direct result of the rinsing operation because such clear water commonly contains minerals which are in suspension but tend to settle out and deposit within the lines during the rinse. It is common practice, therefore, to add a weak liquid acid or a liquid alkaline detergent to the rinse water in order to maintain the minerals in suspension and thereby prevent this deposit in the line which is being rinsed.

The addition of the liquid acid or alkaline detergent creates a need for automatic dispensing or metering of the liquid into the entire supply of water since the entire washing and rinsing operation is conventionally carried out in timed automatic sequence controlled by a timed automatic control system. Various acid metering devices have been designed and used heretofore but all of them, to the best of my knowledge, have serious drawbacks insofar as the need for consistent accurate dispensing is concerned. Most, if not all, of these devices meter the liquid in relation to the amount of pressure of the water supply and since the pressure in a farm water system frequently varies, the amount of acid which is added varies and hence different and undesirable proportions of acid and water are mixed and utilized. Also, such devices normally dispense the liquid through small orifices which tend to plug, resulting in inadequate quantities being added to the rinsing water. My invention is directed toward eliminating these disadvantages.

In addition, different locations have water of different degrees of hardness. Under such conditions, there is need for a system which can readily be adjusted to the peculiar needs of each location. Also, the degree of hardness of water at a given location may vary, depending upon the season and amount of rainfall. As a result, there is a definite need for a liquid alkaline detergent or acid dispensing system which will function accurately and simply.

It is a general object of my invention to provide a novel and improved liquid additive system of simple and inexpensive construction and operation.

A more specific object is to provide a novel and improved liquid additive system of simple and inexpensive construction and operation which will meter or dispense the acid in more accurate quantities or proportions.

Another object is to provide a novel and improved liquid additive system of simple and inexpensive construction and operation which is readily and easily adjustable to dispense or meter different quantities of acid or liquid detergent and which will do so accurately and consistently irrespective of variations in the water pressure.

Another object is to provide a novel and improved liquid additive system which will not tend to plug through prolonged periods of usage and hence will meter or dispense accurately throughout such periods.

These and other objects and advantages of my invention will more fully appear from the following description, made in connection with the accompanying drawings, wherein like reference characters refer to the same or similar parts throughout the several views, and in which:

FIG. 1 is a perspective view of my liquid additive system with portions of the structure broken away to simplify the disclosure.

FIG. 2 is a perspective view on an enlarged scale of some of the details of the liquid additive system with particular emphasis on the source of suction and control therefor as well as the metering chamber which draws the liquid into the system.

FIG. 3 is a side elevation of the metering chamber in side elevation and on a still larger scale, with portions thereof broken away to show the interior thereof; and FIG. 4 is a plan view taken along line 4—4 of FIG. 3.

My liquid additive device is adapted for use in conjunction with washing and rinsing equipment for milk lines and milking machine systems of the type which automatically first rinse the milk lines, then automatically wash the milk lines and subsequently automatically again rinse the interior of the line. Such a system conventionally includes a wash tank 5 into which the rinsing solution is first drawn and from which the rinsing solution is circulated through the milk lines and then returned to the tank for recirculation. Controls 6 control this circulation and after a predetermined period of time, the circulation ceases and the rinse water is automatically drained from the tank 5. Thereafter the washing solution is introduced into the interior of the tank and the washing of the interior of the lines is likewise controlled by the control box 6. The wash water is circulated through the lines in much the same manner as the rinse water. After the washing operation has been completed, the control box 6 causes the tank 5 to be drained and the conventional rinse water to be introduced into the wash tank 5 for circulation through the milk lines. Thus it will be seen that the controls 6 control the entire rinsing, washing, and subsequent rinsing operation in timed sequence and that all of this is old. My liquid additive device is preferably installed directly into such a system and controlled by the controls 6 so as to automatically draw the acid or liquid alkaline detergent in proper quantities and dispense the same into the rinse water automatically at the proper time.

As shown in the drawings, my liquid additive device includes a tubular member 7 which has substantially closed upper and lower end portions 8 and 9, respectively. As shown, it has a bottom 10 and a discharge outlet 11. A flap-type suction-responsive valve 12 extends across the exterior of the outlet 11 and is adapted to be held in closed position by suction within the interior of the tubular member 7. This flap valve 12 is also adapted to be opened by the weight of the liquid within the container or tubular member 7 when the interior approaches atmospheric conditions. A bracket member 13 is mounted on the tank 5 and supports the tubular member 7 in vertically extending position.

A conduit 14 extends between the interior of the tubular member and the main vacuum line 15 which is normally associated with a milking line system. It will be readily understood, of course, that some other source of vacuum may be utilized if it is desirable. A solenoid valve 16 is interposed within the conduit 14 and is movable between open and closed position so as to bring the interior of the tubular member 7 into and out of fluid communication with the vacuum line 15 as desired. The solenoid valve 16 is electrically connected to and controlled by the controls 6 as best shown in FIG. 1. One end portion 17 of the conduit 14 is slidably received in the upper end of the tubular member 7 in a bore provided therefor and this end portion terminates in a radially outwardly flared mouth 18. An Allen set screw 19 secures the mouth 18 at any desired elevation within the tubular member 7 since the elevation of the mouth may be adjusted vertically by sliding the end portion 17 relative to the upper end of the tubular member after first loosening the set screw 19.

A ball float 20 having a diameter larger than that of the mouth 18 and smaller than that of the interior of the tubular member 7 is disposed between the mouth 18 and the discharge outlet 11. As shown, this ball float 20 is maintained in slightly spaced relation to the bottom 10 of the tubular member 7 by a pair of pins 21 and 22 which function to maintain the spaced relation in order to prevent the ball from preventing the escape of all of the acid at the desired time.

A port 23 is formed in the upper end of the tubular member 7 and this port is connected by a conduit 24 to a source of liquid acid or alkaline detergent 25 contained, as shown in the drawings, in a jug 26. As shown, the source of acid or liquid alkaline detergent 25 is disposed below the port 23. A bleeder hole 27 is also formed in the upper end portion 8 of the tubular member 7 and this bleeder opening, although small in diameter, constantly maintains the interior of the tubular member 7 in communication with the exterior so that air may bleed into the interior of the tubular member whenever the same is below atmospheric pressure conditions.

As described above, the normal washing operation is controlled by the controls 6 and at the end thereof rinse water is drawn into the tank. As soon as the predetermined supply of rinse water has been drawn into the tank 5, the controls 6 close the electric current to the solenoid valve 16 causing the latter to open and bringing the source of vacuum 15 into fluid communication via the conduit 14 with the interior of the tubular member 7. Reduction of the pressure within the tubular member 7 causes the flap valve 12 to be drawn to closed position and the interior of the tubular member to be evacuated. Since the effect of the source of vacuum 15 is far greater than the small amount of air which can be introduced through the bleeder hole 27, the net result will be that the reduced air pressure within the tubular member 7 will cause the acid or liquid alkaline detergent 25 to rise through the conduit 24 and enter the interior of the tubular member 7. As the liquid 25 enters the tubular member 7 it descends through the bottom thereof and as the level of acid rises, the float member 20 rises with it. As the float 20 approaches the flared mouth 18 of the end portion 17 of the conduit 14, the float member 20 will be drawn in by the effect of the suction into engaging relation with the mouth 18 and will close off the same, thereby closing off the effects of the main vacuum line 15 so that air will no longer be withdrawn from the interior of the tubular member 7. Meanwhile, a small amount of air is entering the bleeder hole 27 and gradually the interior of the tubular member 7 will approach atmospheric conditions. The float 20, however, will remain in closing relation to the mouth 18 as a result of the effects of the suction. Finally, sufficient air will have been admitted into the interior of the tubular member 7 so that the flap valve 12 will open and the liquid contained within tubular member will descend into the rinse water. It will be readily seen that the amount of liquid which is drawn into the tubular member 7 can be very quickly and easily regulated by regulating the extent to which the end portion 17 of the conduit 14 extends vertically downwardly into the interior of the tubular member 7.

The controls 6 are arranged, of course, so as to permit the solenoid valve 16 to move to closed position prior to commencing the next rinsing and washing cycle. It will be readily seen that my acid metering device has very distinct advantages since the simple and easy vertical adjustment of the elevation of the mouth 18 can be utilized to regulate the amount of liquid which is to be metered or dispensed thereby in accordance with the needs of any given location which may vary as pointed out hereinbefore. It will be noted that the dispensing operation is completely automatic once the elevation of the mouth 18 has been determined. Moreover, it is extremely accurate and does not have any tendency whatever to plug as is the case with other metering devices which utilize relatively small orifices. It will be understood that the controls 6 may, if desired, consist of merely a simple timing device which at a predetermined time closes a switch to energize the solenoid valve 16. Preferably, however, such a device is coordinated with the other rinsing and washing controls which are conventional in the dairy industry for effecting the rinsing and washing of milking systems.

It will, of course, be understood that various changes may be made in the form, details, arrangement and proportions of the parts without departing from the scope of my invention which consists of the matter shown and described herein and set forth in the appended claims.

What is claimed is:

1. A liquid additive metering system comprising:
   (a) a source of suction,
   (b) a vertically extending tubular member having substantially closed end portions and having a bottom and a discharge outlet disposed adjacent its bottom,
   (c) a conduit connecting said source of suction in fluid communication with the interior of said tubular member,
   (d) said conduit extending into the upper end portion of said tubular member and terminating in a downwardly facing mouth at a level between the ends of said tubular member,
   (e) said conduit being slidable longitudinally within said tubular member for vertical adjustment of the level of its said mounth therewithin,
   (f) releasable means securing said conduit against sliding movement within said tubular member to hold said conduit mouth at a desired level and permit vertical adjustment thereof upon release of said means,
   (g) valve means interposed within said conduit and movable between open and closed positions,
   (h) means connected to said valve means for moving the same between open and closed positions as desired,
   (i) a source of liquid additive,
   (j) a second conduit connecting said liquid additive source in fluid communication with the interior of said tubular member at a point elevated relative to said source of liquid additive,
   (k) a suction-responsive flap valve connected to said tubular member and extending across the exterior of said discharge outlet in opening and closing relation and constructed and arranged in position to close the same when suction is applied to the interior of said tubular member and being movable to open position by the weight of liquid additive contained in said tubular member when the interior of said tubular approaches atmospheric conditions,
   (l) said tubular member having a small air-bleeder hole formed therein at a level above the level of said conduit mouth and bringing the interior of said tubular member into fluid communication with the exterior atmosphere, and
   (m) a ball-type float disposed within said tubular member below said conduit mouth and having a diameter larger than that of said conduit mouth and slightly smaller than that of said tubular member.

2. The structure defined in claim 1 wherein said conduit mouth is flared radially outwardly.

3. The structure defined in claim 1 wherein said second conduit connects said source of liquid additive at a level above said mouth of said first mentioned conduit.

4. The structure defined in claim 1 wherein said valve is a solenoid valve, and spacer pins carried by said tubular member within its interior adjacent its bottom for maintaining said float in spaced relation to the bottom of said tubular member.

5. The structure defined in claim 1 wherein said first mentioned conduit has a terminal portion terminating in said mouth and extending coaxially of said tubular member.

6. A liquid acid additive metering system comprising:
(a) a source of suction,
(b) a vertically extending tubular member having substantially closed end portions and having a bottom and a discharge outlet disposed adjacent its bottom,
(c) a conduit connecting said source of suction in fluid communication with the interior of said tubular member,
(d) said conduit having an end portion extending into said tubular member and terminating in a downwardly facing mouth at a level above the bottom of said tubular member,
(e) valve means interposed within said conduit and movable between open and closed positions,
(f) means connected to said valve means for moving the same between open and closed positions as desired,
(g) a source of liquid additive,
(h) a second conduit connecting said liquid additive source in fluid communication with the interior of said tubular member at a point elevated relative to said source of liquid additive,
(i) a section-responsive flap valve connected to said tubular member and extending across the exterior of said discharge outlet in opening and closing relation and constructed and arranged in position to close the same when suction is applied to the interior of said tubular member and being movable to open position by the weight of liquid additive contained in said tubular member when the interior of said tubular member approaches atmospheric conditions,
(j) a rounded float disposed within said tubular member below said conduit mouth and having a diameter larger than that of said conduit mouth and slightly smaller than that of said tubular member and being adapted to rise with the level of liquid additive drawn into said tubular member interior by said source of suction until said float engages said conduit mouth and closes the same, and
(k) said tubular member having means connected therewith for introducing air into said container interior to cause the same to approach atmospheric conditions while said float prevents fluid communication between said suction source and said tubular member interior.

7. Liquid additive dispensing apparatus comprising:
(a) a source of suction,
(b) a substantially closed container for the introduction of liquid additive thereinto and having a bottom and a discharge outlet disposed adjacent its bottom,
(c) conduit means connecting said source of suction with the interior of said container at an elevation above said bottom and above the level to which liquid additive is to be introduced into said container,
(d) valve means interposed within said conduit means and movable between open and closed positions,
(e) said valve means when in open position placing said source of vacuum in fluid communication with the interior of said container,
(f) control mechanism connected to said valve means in controlling relation and causing said valve means to move between open and closed positions,
(g) a source of liquid additive,
(h) second conduit means connecting said liquid additive source in fluid communication with the interior of said container at a point elevated relative to said source of liquid additive,
(i) a suction-responsive valve connected to said container and extending across said discharge outlet in opening and closing relation and constructed and arranged in position to close the same when suction is applied to the interior of said container and being movable to open position by the weight of liquid additive contained in said container when the interior of said container approaches atmospheric conditions,
(j) liquid-level responsive float means disposed within said container and constructed and arranged to bring the interior of said container out of fluid communication with said suction source when the liquid additive drawn into said container by suction from said suction source reaches a predetermined level, and
(k) means connected with the interior of said container for introducing air into the interior of said container to cause the same to approach atmospheric conditions while said liquid level responsive means prevents fluid communication between said suction source and the interior of said container.

8. Liquid additive dispensing apparatus comprising:
(a) a source of suction,
(b) a substantially closed container for receiving liquid additive therein and having a bottom and a discharge outlet disposed adjacent its bottom,
(c) conduit means connecting said source of suction with the interior of said container at an elevation above said bottom and above the level to which liquid additive is to be introduced into said container,
(d) control means connected to said conduit means in controlling relation for bringing said source of suction into fluid communication with the interior of said container via said conduit means when desired,
(e) a source of liquid additive,
(f) second conduit means connecting said liquid additive source in fluid communication with the interior of said container at a point elevated relative to said source of liquid additive,
(g) a suction responsive valve disposed across said discharge opening in opening and closing relation thereto and constructed and arranged in position to close the same when suction is applied to the interior of said container and being movable to open position by the weight of liquid held within said container when the interior of said container approaches atmospheric conditions,
(h) vertically movable liquid lever responsive means disposed within said container and constructed and arranged to bring the interior of said container out of fluid communication with said suction source when the liquid additive drawn into said container by suction from said suction source reaches a predetermined level, and
(i) means connected with the interior of said container for introducing air into said container interior to cause the same to approach atmospheric conditions while said liquid level responsive means prevents fluid communication between said suction source and said container interior.

9. The structure defined in claim 8 wherein said liquid-level responsive means within said container engages and closes off said first mentioned conduit means when the liquid-additive drawn into said container by the suction from said suction source reaches a predetermined level.

10. The structure defined in claim 8 wherein said liquid-level responsive means includes a float member and said first mentioned conduit means has a terminal portion facing downwardly directly thereabove in position to be closed off by said float member as the latter rises with the upper level of the liquid additive as it is drawn into said container by the suction from said source of suction.

11. The structure defined in claim 8 wherein said first mentioned conduit means extends into said container and has a vertically adjustable terminal portion facing downwardly and wherein said liquid-level responsive means includes a float member confined within said container directly below said terminal portion and floating upon the upper level of the liquid additive as it is introduced in said container to effectively close said terminal portion of said first mentioned conduit means when the liquid additive reaches a predetermined level within said container.

12. The structure defined in claim 10 wherein said terminal portion of said first mentioned conduit means is flared radially outwardly and said float member has a rounded exterior surface which engages said terminal portion when the liquid additive in said container reaches said predetermined level.

13. The structure defined in claim 8 wherein said container is comprised of a vertically extending tubular member and wherein said first mentioned conduit means has a terminal portion extending co-axially and downwardly through the upper end of said tubular member into its interior, said liquid-level responsive means being comprised of a ball-like float member having a diameter slightly less than that of the interior of said tubular member.

14. The structure in claim 13 and means for adjusting the depth to which said terminal portion extends into said container.

References Cited by the Examiner

UNITED STATES PATENTS 3,019,764   2/62   Schilling _____ 222—450 X

LOUIS J. DEMBO, *Primary Examiner.*